(12) United States Patent
Yliaho

(10) Patent No.: US 10,521,015 B2
(45) Date of Patent: Dec. 31, 2019

(54) CONTROL APPARATUS FOR A TACTILE AUDIO DISPLAY

(71) Applicant: Nokia Technologies Oy, Espoo (FI)

(72) Inventor: Marko Tapani Yliaho, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/769,447

(22) PCT Filed: Mar. 1, 2013

(86) PCT No.: PCT/IB2013/051662
§ 371 (c)(1),
(2) Date: Aug. 20, 2015

(87) PCT Pub. No.: WO2014/132104
PCT Pub. Date: Sep. 4, 2014

(65) Prior Publication Data
US 2016/0004311 A1    Jan. 7, 2016

(51) Int. Cl.
*G10H 1/043*    (2006.01)
*H04R 29/00*    (2006.01)
*G10H 1/16*    (2006.01)
*G06F 3/01*    (2006.01)
*G06F 3/041*    (2006.01)
(Continued)

(52) U.S. Cl.
CPC .............. *G06F 3/016* (2013.01); *G06F 3/041* (2013.01); *G06F 3/0416* (2013.01); *G06F 3/165* (2013.01); *G06F 3/167* (2013.01); *H01H 13/85* (2013.01); *H04R 3/14* (2013.01); *H04R 17/00* (2013.01); *H01H 2003/008* (2013.01);
(Continued)

(58) Field of Classification Search
CPC ........ H04R 17/00; H04R 25/405; H04R 1/10; G06F 2203/014; G10K 2210/129; G10K 2210/3212; A63F 13/285; B06B 1/045; B06B 1/0603; B06B 2201/53; H01H 13/85; H01H 2003/008; G10L 2210/129
USPC .......................................... 381/58–59, 61–62
See application file for complete search history.

(56) References Cited

U.S. PATENT DOCUMENTS

2007/0097073 A1    5/2007    Takashima et al.
2009/0096632 A1    4/2009    Ullrich et al. ............. 340/825.2
(Continued)

FOREIGN PATENT DOCUMENTS

WO    2007047960 A2    4/2007
WO    2010085575 A1    7/2010
WO    2012090031 A1    7/2012

OTHER PUBLICATIONS

International Search Report and Written Opinion received for corresponding Patent Cooperation Treaty Application No. PCT/IB2013/051662, dated Dec. 12, 2013, 15 pages.

*Primary Examiner* — George C Monikang
(74) *Attorney, Agent, or Firm* — Harrington & Smith

(57) ABSTRACT

An apparatus comprising: an input configured to receive at feast one signal comprising a haptic signal part and an audio signal part; a stream processor configured to separate the at least one signal to generate at least one haptic signal and at least one audio signal; a router configured to route the at least one haptic signal as a first output signal to a first output and the at least one audio signal as a second output signal to a second output; and an output configured to output the processed first output signal such that it generates a haptic effect and the processed second output signal generates an acoustic effect.

18 Claims, 12 Drawing Sheets

(51) Int. Cl.

| | | |
|---|---|---|
| *H01H 13/85* | (2006.01) | |
| *H04R 17/00* | (2006.01) | |
| *G06F 3/16* | (2006.01) | |
| *H04R 3/14* | (2006.01) | |
| *H01H 3/00* | (2006.01) | |

(52) U.S. Cl.
CPC ..... *H01H 2215/05* (2013.01); *H04R 2400/03* (2013.01); *H04R 2499/11* (2013.01)

(56) References Cited

U.S. PATENT DOCUMENTS

| | | | |
|---|---|---|---|
| 2009/0128306 A1 | 5/2009 | Luden et al. | 340/407.1 |
| 2010/0141408 A1* | 6/2010 | Doy | G06F 3/016 |
| | | | 340/407.2 |
| 2010/0260371 A1* | 10/2010 | Afshar | H04R 7/24 |
| | | | 381/394 |
| 2010/0284555 A1* | 11/2010 | Suzuki | H04R 15/00 |
| | | | 381/300 |
| 2012/0026114 A1 | 2/2012 | Sup | |
| 2012/0045083 A1* | 2/2012 | Lin | H04R 1/10 |
| | | | 381/380 |
| 2012/0126959 A1 | 5/2012 | Zarrabi et al. | 340/407.1 |
| 2013/0016855 A1* | 1/2013 | Lee | H04R 3/00 |
| | | | 381/97 |

* cited by examiner

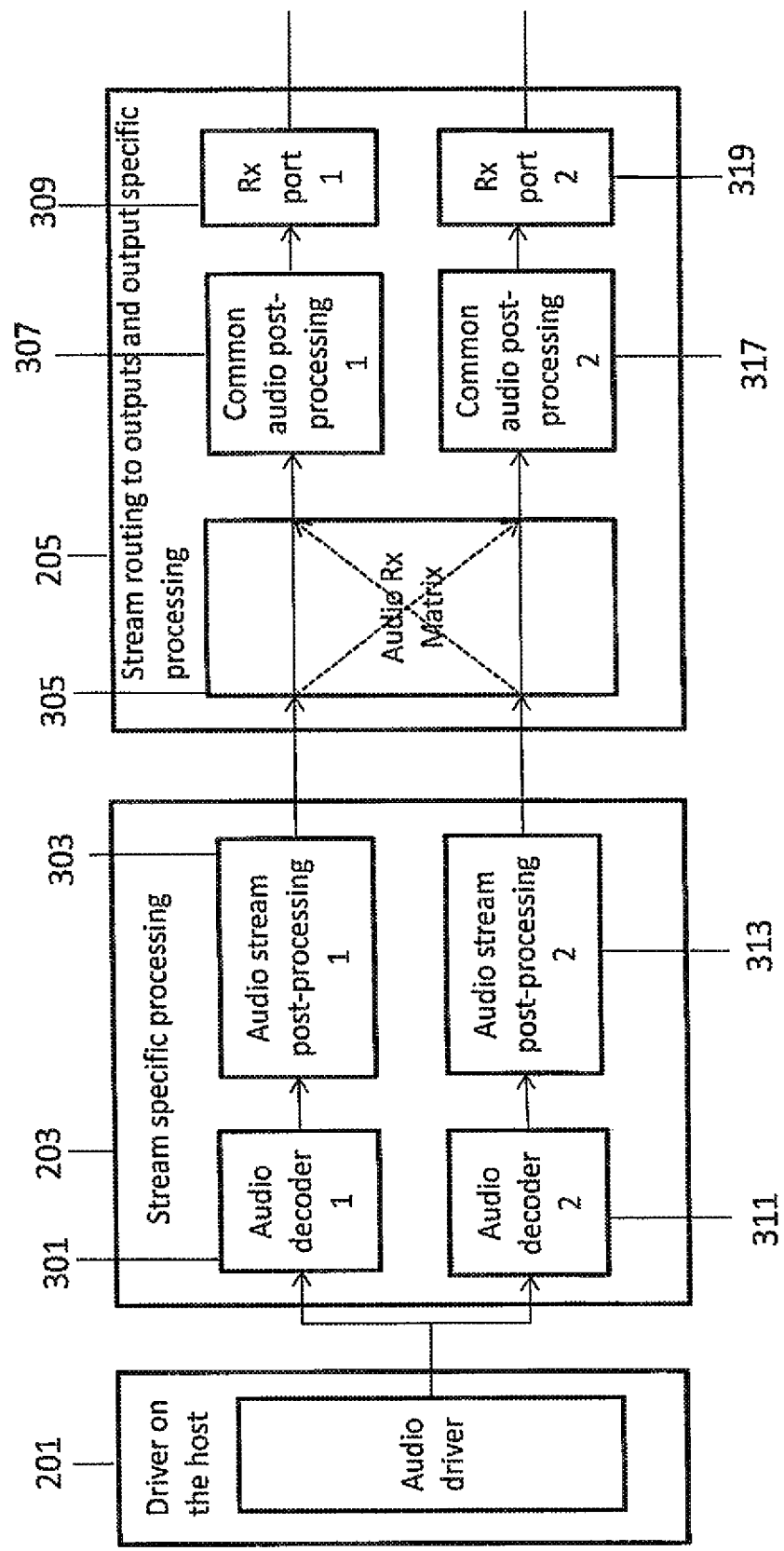
Figure 4: Figure 4A

Figure 4: Figure 4B
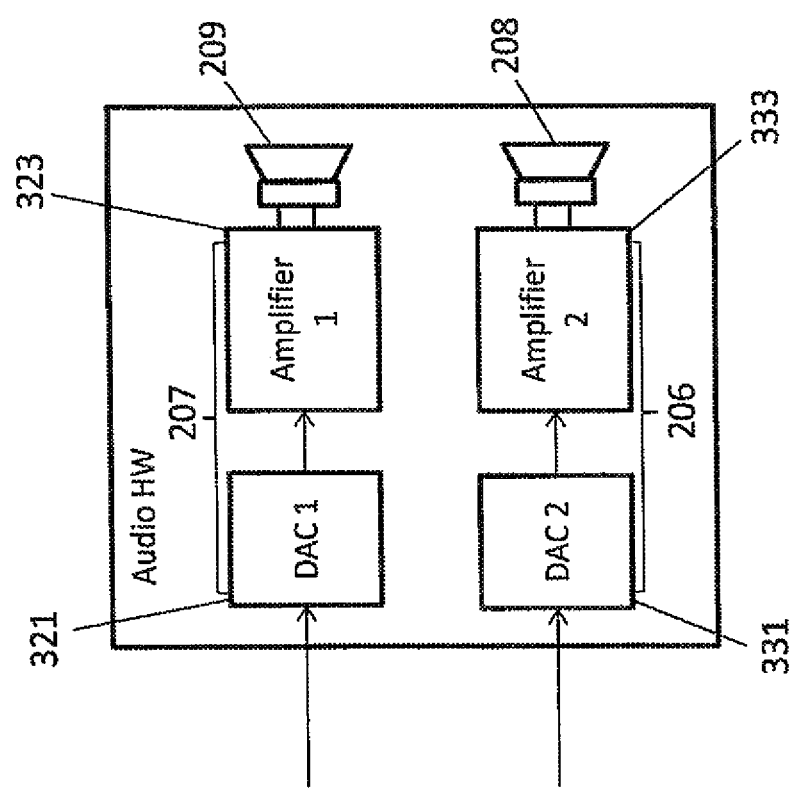

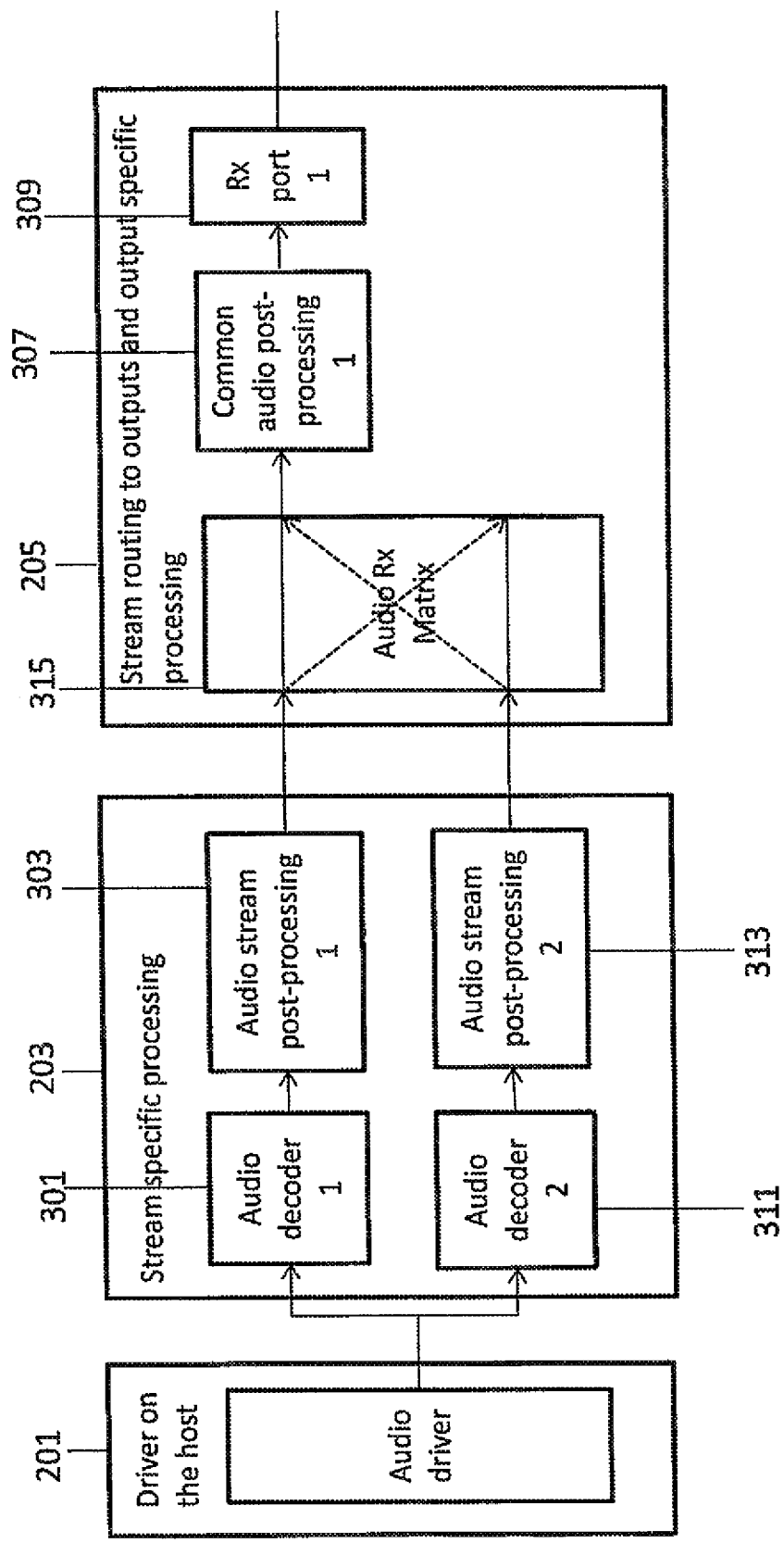
Figure 5: Figure 5A

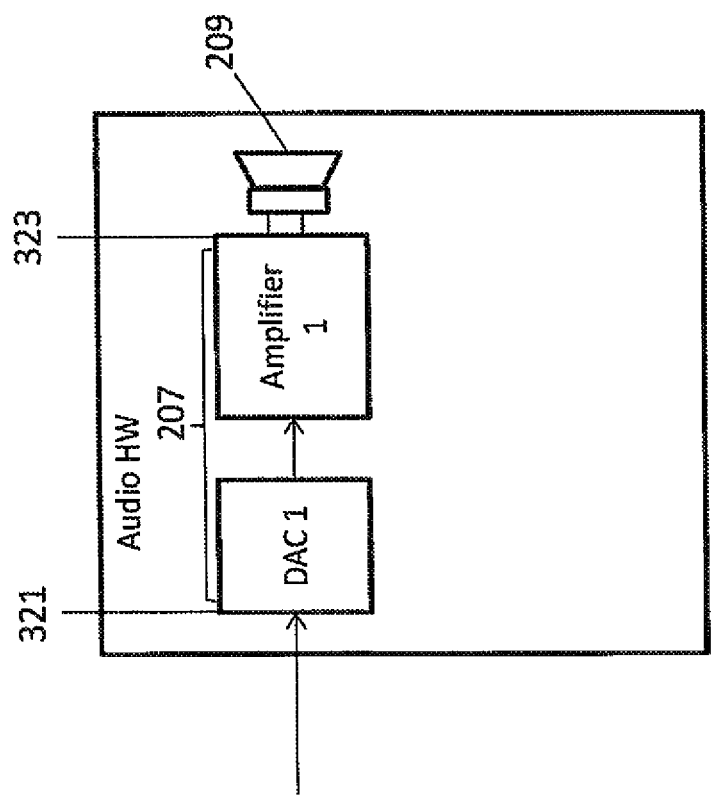
Figure 5: Figure 5B

CONTROL APPARATUS FOR A TACTILE AUDIO DISPLAY

RELATED APPLICATION

This application was originally filed as Patent Cooperation Treaty Application No. PCT/IB2013/051662 filed Mar. 1, 2013.

FIELD

The present invention relates to a providing control apparatus for displays providing tactile and audio functionality. The invention further relates to, but is not limited to, control apparatus for displays providing tactile and audio functionality for use in mobile devices.

BACKGROUND

Many portable devices, for example mobile telephones, are equipped with a display such as a glass or plastic display window for providing information to the user. Furthermore such display windows are now commonly used as touch sensitive inputs. The use of a touch sensitive input with the display has the advantage over a mechanical keypad in that the display may be configured to show a range of different inputs depending on the operating mode of the device. For example, in a first mode of operation the display may be enabled to enter a phone number by displaying a simple numeric keypad arrangement and in a second mode the display may be enabled for text input by displaying an alphanumeric display configuration such as a simulated Qwerty keyboard display arrangement.

The display such as glass or plastic is typically static in that although the touch screen can provide a global haptic feedback simulating a button press by use of a vibra it does not simulate features shown on the display. In other words any tactile feedback is not really localised as the whole display or device vibrates and the display is unable to provide a different sensation other than that of glass or plastic.

STATEMENT

According to an aspect, there is provided a method comprising: receiving at least one signal comprising a haptic signal part and an audio signal part; separating the at least one signal to generate at least one haptic signal and at least one audio signal; routing the at least one haptic signal as a first output signal to a first output and the at least one audio signal as a second output signal to a second output; and outputting the processed first output signal such that it generates a haptic effect and the processed second output signal generates an acoustic effect.

Separating the at least one signal may comprise frequency filtering the at least one signal to generate the at least one haptic signal and the at least one audio signal.

Frequency filtering the at least one signal may comprise: low pass filtering the at least one signal to generate the at least one haptic signal; and high pass filtering the at least one signal to generate the at least one audio signal.

The method may further comprise signal processing separately the at least one haptic signal to generate at least one processed haptic signal and the at least one audio signal to generate at least one processed audio signal.

Signal processing separately the at least one haptic signal and the at least one audio signal may comprise at least one of: gain control of the at least one haptic signal; gain control of the at least one audio signal; volume control of the at least one haptic signal; volume control of the at least one audio signal; muting of the at least one haptic signal; and muting of the at least one audio signal.

Routing the at least one haptic signal to a first output and the at least one audio signal to a second output may comprise at least one of: routing the at least one processed haptic signal and the at least one audio signal as a second output signal wherein the first output and the second output are separate outputs; and combining the at least one processed haptic signal and the at least one processed audio signal, wherein the first output and the second output are the same output.

The method may further comprise signal processing the first output signal and the second output signal.

Signal processing the first output signal and the second output signal may comprise at least one of: processing the first output signal and second output signal based on the routing output; equalising the first output signal and second output signal based on the routing output; tuning the first output signal and second output signal based on the routing output; gain controlling the first output signal and second output signal based on the routing output; volume controlling the first output signal and second output signal based on the routing output; and muting the first output signal and second output signal based on the routing output.

The first output may be coupled to at least one of: a tactile audio display; at least one actuator configured to actuate an apparatus for generating a haptic effect; at least one piezoelectric actuator configured to actuate an apparatus for generating a haptic effect; at least one vibra; and at least one digital to analogue converter and/or amplifier configured to pass a signal to an actuator for actuating an apparatus.

The second output may be coupled to at least one of: a tactile audio display; at least one piezoelectric actuator configured to actuate an apparatus for generating an acoustic output; a headset; headphones; earphones; earspeakers; earbuds; and at least one digital to analogue converter and/or amplifier configured to pass a signal to an actuator for generating an acoustic output.

Separating the at least one signal to generate at least one haptic signal and at least one audio signal may comprise: identifying within the at least one signal a first track comprising the at least one haptic signal and a second track comprising the at least one audio signal.

The at least one signal may comprise a multichannel audio signal and identifying within the at least one signal a first track comprising the at least one haptic signal and a second track comprising the at least one audio signal comprises: determining a first channel is the at least one haptic signal; and determining a second channel is the at least one audio signal.

According to a second aspect there is provided a method comprising: generating at least one signal comprising a haptic signal part and an audio signal part, wherein generating the at least one signal comprises combining the haptic signal part and the audio signal part in at least one of: frequency combining the haptic signal part as a lower frequency component of the at least one signal and the audio signal part as the higher frequency component of the at least one signal; temporal combining the haptic signal part as a first time instance component of the at least one signal and the audio signal part as a separate second time instance component of the at least one signal; and channel combining the haptic signal part as a first channel component of the at least one signal and the audio signal part as a second channel component of a multichannel signal.

The method may further comprise at least one of: storing the at least one signal within a storage element such that at a later time the method can further receive the at least one signal from the storage element; and transmitting the at least one signal from a first apparatus such that the method can further receive the at least one signal at a further apparatus.

According to a third aspect there is provided an apparatus comprising at least one processor and at least one memory including computer program code for one or more programs, the at least one memory and the computer program code configured to, with the at least one processor, cause the apparatus at least to: receive at least one signal comprising a haptic signal part and an audio signal part; separate the at least one signal to generate at least one haptic signal and at least one audio signal; route the at least one haptic signal as a first output signal to a first output and the at least one audio signal as a second output signal to a second output; and output the processed first output signal such that it generates a haptic effect and the processed second output signal generates an acoustic effect.

Separating the at least one signal may cause the apparatus to frequency filter the at least one signal to generate the at least one haptic signal and the at least one audio signal.

Frequency filtering the at least one signal may cause the apparatus to: low pass filter the at least one signal to generate the at least one haptic signal; and high pass filter the at least one signal to generate the at least one audio signal.

The apparatus may further be caused to signal process separately the at least one haptic signal to generate at least one processed haptic signal and the at least one audio signal to generate at least one processed audio signal.

Signal processing separately the at least one haptic signal and the at least one audio signal may cause the apparatus to perform at least one of: gain control of the at least one haptic signal; gain control of the at least one audio signal; volume control of the at least one haptic signal; volume control of the at least one audio signal; mute the at least one haptic signal; and mute the at least one audio signal.

Routing the at least one haptic signal to a first output and the at least one audio signal to a second output may cause the apparatus to perform at least one of: route the at least one processed haptic signal and the at least one audio signal as a second output signal wherein the first output and the second output are separate outputs; and combine the at least one processed haptic signal and the at least one processed audio signal, wherein the first output and the second output are the same output.

The apparatus may be further caused to signal process the first output signal and the second output signal.

Signal processing the first output signal and the second output signal may cause the apparatus to perform at least one of: process the first output signal and second output signal based on the routing output; equalise the first output signal and second output signal based on the routing output; tune the first output signal and second output signal based on the routing output; gain control of the first output signal and second output signal based on the routing output; volume control of the first output signal and second output signal based on the routing output; and mute the first output signal and second output signal based on the routing output.

The first output may be coupled to at least one of: a tactile audio display; at least one actuator configured to actuate an apparatus for generating a haptic effect; at least one piezoelectric actuator configured to actuate an apparatus for generating a haptic effect; at least one vibra; and at least one digital to analogue converter and/or amplifier configured to pass a signal to an actuator for actuating an apparatus.

The second output may be coupled to at least one of: a tactile audio display; at least one piezoelectric actuator configured to actuate an apparatus for generating an acoustic output; a headset; headphones; earphones; earspeakers; earbuds; and at least one digital to analogue converter and/or amplifier configured to pass a signal to an actuator for generating an acoustic output.

Separating the at least one signal to generate at least one haptic signal and at least one audio signal may cause the apparatus to identify within the at least one signal a first track comprising the at least one haptic signal and a second track comprising the at least one audio signal.

The at least one signal may comprise a multichannel audio signal and identifying within the at least one signal a first track comprising the at least one haptic signal and a second track comprising the at least one audio signal may cause the apparatus to: determine a first channel is the at least one haptic signal; and determine a second channel is the at least one audio signal.

According to a fourth aspect there is provided an apparatus comprising at least one processor and at least one memory including computer program code for one or more programs, the at least one memory and the computer program code configured to, with the at least one processor, cause the apparatus at least to: generate at least one signal comprising a haptic signal part and an audio signal part, wherein generating the at least one signal comprises combining the haptic signal part and the audio signal part in at least one of; frequency combining the haptic signal part as a lower frequency component of the at least one signal and the audio signal part as the higher frequency component of the at least one signal; temporal combining the haptic signal part as a first time instance component of the at least one signal and the audio signal part as a separate second time instance component of the at least one signal; and channel combining the haptic signal part as a first channel component of the at least one signal and the audio signal part as a second channel component of a multichannel signal.

The apparatus may be caused to perform at least one of: store the at least one signal within a storage element such that at a later time the apparatus may be caused to further receive the at least one signal from the storage element; and transmit the at least one signal such that at least one further apparatus may be caused to further receive the at least one signal.

According to a fifth aspect there is provided an apparatus comprising: means for receiving at least one signal comprising a haptic signal part and an audio signal part; means for separating the at least one signal to generate at least one haptic signal and at least one audio signal; means for routing the at least one haptic signal as a first output signal to a first output and the at least one audio signal as a second output signal to a second output; and means for outputting the processed first output signal such that it generates a haptic effect and the processed second output signal generates an acoustic effect.

The means for separating the at least one signal may comprise means for frequency filtering the at least one signal to generate the at least one haptic signal and the at least one audio signal.

The means for frequency filtering the at least one signal may comprise: means for low pass filtering the at least one signal to generate the at least one haptic signal; and means for high pass filtering the at least one signal to generate the at least one audio signal.

The apparatus may further comprise means for signal processing separately the at least one haptic signal to generate at least one processed haptic signal and the at least one audio signal to generate at least one processed audio signal.

The means for signal processing separately the at least one haptic signal and the at least one audio signal may comprise at least one of: means for gain controlling of the at least one haptic signal; means for gain controlling of the at least one audio signal; means for volume controlling of the at least one haptic signal; means for volume controlling of the at least one audio signal; means for muting the at least one haptic signal; and means for muting at least one audio signal.

The means for routing the at least one haptic signal to a first output and the at least one audio signal to a second output may comprise at least one of: means for routing the at least one processed haptic signal and the at least one audio signal as a second output signal wherein the first output and the second output are separate outputs; and means for combining the at least one processed haptic signal and the at least one processed audio signal, wherein the first output and the second output are the same output.

The apparatus may further comprise means for signal processing the first output signal and the second output signal.

The means for signal processing the first output signal and the second output signal may comprise at least one of: means for processing the first output signal and second output signal based on the routing output; means for equalising the first output signal and second output signal based on the routing output; means for tuning the first output signal and second output signal based on the routing output; means for gain controlling of the first output signal and second output signal based on the routing output; means for volume controlling of the first output signal and second output signal based on the routing output; and means for muting of the first output signal and second output signal based on the routing output.

The first output may be coupled to at least one of: a tactile audio display; at least one actuator configured to actuate an apparatus for generating a haptic effect; at least one piezoelectric actuator configured to actuate an apparatus for generating a haptic effect; at least one vibra; and at least one digital to analogue converter and/or amplifier configured to pass a signal to an actuator for actuating an apparatus.

The second output may be coupled to at least one of: a tactile audio display; at least one piezoelectric actuator configured to actuate an apparatus for generating an acoustic output; a headset; headphones; earphones; earspeakers; earbuds; and at least one digital to analogue converter and/or amplifier configured to pass a signal to an actuator for generating an acoustic output.

The means for separating the at least one signal to generate at least one haptic signal and at least one audio signal may comprise means for identifying within the at least one signal a first track comprising the at least one haptic signal and a second track comprising the at least one audio signal.

The at least one signal may comprise a multichannel audio signal and the means for identifying within the at least one signal a first track comprising the at least one haptic signal and a second track comprising the at least one audio signal may comprise: means for determining a first channel is the at least one haptic signal; and means for determining a second channel is the at least one audio signal.

According to a sixth aspect there is provided an apparatus comprising: means for generating at least one signal comprising a haptic signal part and an audio signal part, wherein generating the at least one signal comprises combining the haptic signal part and the audio signal part in at least one of: frequency combining the haptic signal part as a lower frequency component of the at least one signal and the audio signal part as the higher frequency component of the at least one signal; temporal combining the haptic signal part as a first time instance component of the at least one signal and the audio signal part as a separate second time instance component of the at least one signal; and channel combining the haptic signal part as a first channel component of the at least one signal and the audio signal part as a second channel component of a multichannel signal.

The apparatus may comprise at least one of: means for storing the at least one signal within a storage element such that at a later time the apparatus can further receive the at least one signal from the means for storing; and means for transmitting the at least one signal such that at least one further apparatus may receive the at least one signal.

According to a seventh aspect there is provided an apparatus comprising: an input configured to receive at least one signal comprising a haptic signal part and an audio signal part; a stream processor configured to separate the at least one signal to generate at least one haptic signal and at least one audio signal; a router configured to route the at least one haptic signal as a first output signal to a first output and the at least one audio signal as a second output signal to a second output; and an output configured to output the processed first output signal such that it generates a haptic effect and the processed second output signal generates an acoustic effect.

The stream processor may comprise at least one filter configured to frequency filter the at least one signal to generate the at least one haptic signal and the at least one audio signal.

The at least one filter may comprise: at least one low pass filter configured to low pass filter the at least one signal to generate the at least one haptic signal; and at least one high pass filter configured to high pass filter the at least one signal to generate the at least one audio signal.

The stream processor may further comprise at least one signal processor configured to process separately the at least one haptic signal to generate at least one processed haptic signal and the at least one audio signal to generate at least one processed audio signal.

The at least one signal processor may comprise at least one of: a haptic signal gain controller configured to control the gain of the at least one haptic signal; an audio signal gain controller configured to control the gain of the at least one audio signal; a haptic volume controller configured to control the volume of the at least one haptic signal; an audio volume controller configured to control the volume of the at least one audio signal; a haptic muter configured to mute the at least one haptic signal; and an audio muter configured to mute the at least one audio signal.

The router may be configured to route the at least one processed haptic signal and the at least one audio signal as a second output signal wherein the first output and the second output are separate outputs The router may be configured to combine the at least one processed haptic signal and the at least one processed audio signal, wherein the first output and the second output are the same output.

The router may further comprise at least one common signal processor configured to signal process the first output signal and the second output signal.

The at least one common signal processor may comprise at least one of: at least one signal processor configured to process the first output signal and second output signal based on the routing output; at least one equaliser configured to equalise the first output signal and second output signal based on the routing output; at least one signal tuner configured to tune the first output signal and second output signal based on the routing output; a gain controller configured to control the gain of the first output signal and second output signal based on the routing output; a volume controller configured to control the volume of the first output signal and second output signal based on the routing output; and a muter configured to mute the first output signal and second output signal based on the routing output.

The first output may be coupled to at least one of: a tactile audio display; at least one actuator configured to actuate an apparatus for generating a haptic effect; at least one piezoelectric actuator configured to actuate an apparatus for generating a haptic effect; at least one vibra; and at least one digital to analogue converter and/or amplifier configured to pass a signal to an actuator for actuating an apparatus.

The second output may be coupled to at least one of: a tactile audio display; at least one piezoelectric actuator configured to actuate an apparatus for generating an acoustic output; a headset; headphones; earphones; earspeakers; earbuds; and at least one digital to analogue converter and/or amplifier configured to pass a signal to an actuator for generating an acoustic output.

The router may comprise a signal identifier configured to identify within the at least one signal a first track comprising the at least one haptic signal and a second track comprising the at least one audio signal.

The at least one signal may comprise a multichannel audio signal and the identifier may be configured to determine a first channel is the at least one haptic signal and determine a second channel is the at least one audio signal.

According to an eighth aspect there is provided an apparatus comprising: a signal generator configured to generate at least one signal comprising a haptic signal part and an audio signal part, wherein the signal generator comprises at least one of: a frequency division multiplexer configured to frequency combine the haptic signal part as a lower frequency component of the at least one signal and the audio signal part as the higher frequency component of the at least one signal; a time division multiplexer configured to combine the haptic signal part as a first time instance component of the at least one signal and the audio signal part as a separate second time instance component of the at least one signal; and a channel multiplexer configured to channel combine the haptic signal part as a first channel component of the at least one signal and the audio signal part as a second channel component of a multichannel signal.

The apparatus may comprise at least one of: a memory configured to store the at least one signal such that at a later time the apparatus can further be configured to receive an input at least one signal from the memory; and a transmitter configured to transmit the at least one signal to a further apparatus such that a further apparatus can be configured to receive the at least one signal as an input.

A computer program product stored on a medium for causing an apparatus to may perform the method as described herein.

An electronic device may comprise apparatus as described herein.

A chipset may comprise apparatus as described herein.

SUMMARY OF FIGURES

For better understanding of the present invention, reference will now be made by way of example to the accompanying drawings in which:

FIG. 3, FIG. 4 (which includes FIGS. 4A and 4B), and FIG. 5, (which includes FIGS. 5A and 5B) show schematically example audio/tactile effect control and generation apparatus according to some embodiments;

DESCRIPTION OF EXAMPLE EMBODIMENTS

The application describes apparatus and methods capable of generating, encoding, storing, transmitting and outputting tactile and acoustic outputs from a touch screen device.

Figure 1:
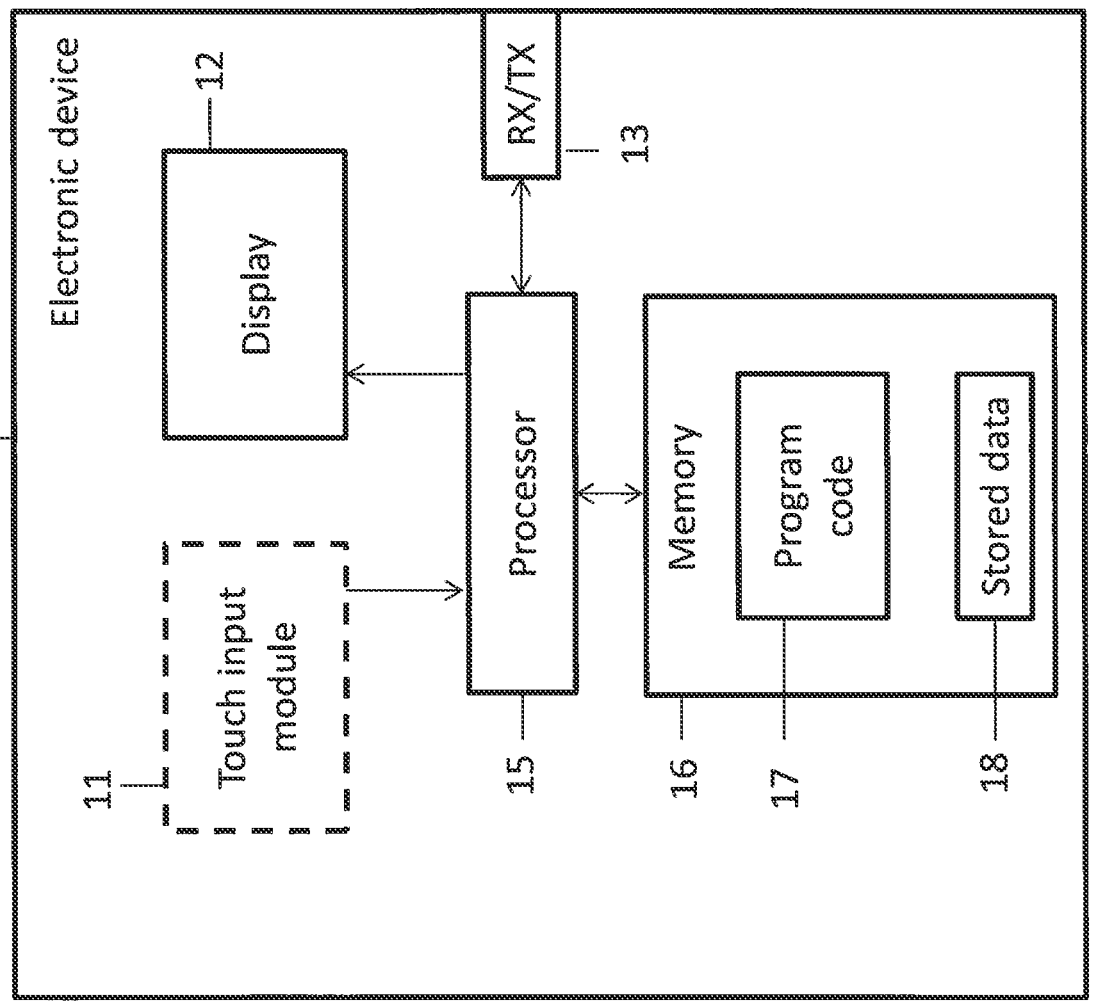
FIG. 1 shows schematically an apparatus suitable for employing some embodiments.

With respect to FIG. 1 a schematic block diagram of an example electronic device 10 or apparatus on which embodiments of the application can be implemented. The apparatus 10 is such embodiments configured to provide improved tactile and acoustic wave generation.

The apparatus 10 is in some embodiments a mobile terminal, mobile phone or user equipment for operation in a wireless communication system. In other embodiments, the apparatus is any suitable electronic device configured to provide an image display, such as for example a digital camera, a portable audio player (mp3 player), a portable video player (mp4 player). In other embodiments the apparatus can be any suitable electronic device with touch interface (which may or may not display information) such as a touch-screen or touch-pad configured to provide feedback when the touch-screen or touch-pad is touched.

The apparatus 10 further in some embodiments comprises a touch input module or user interface 11, which is linked to a processor 15. The processor 15 is further linked to a display 12. The processor 15 is further linked to a transceiver (TX/RX) 13 and to a memory 16.

In some embodiments, the touch input module 11 and/or the display 12 are separate or separable from the electronic device and the processor receives signals from the touch input module 11 and/or transmits and signals to the display 12 via the transceiver 13 or another suitable interface. Furthermore in some embodiments the touch input module 11 and display 12 are parts of the same component. In such embodiments the touch interface module 11 and display 12 can be referred to as the display part or touch display part. In some embodiments the apparatus is controlled or interfaced by means other than touch screen. In other words the apparatus comprises a display 12 but not a touch interface module 11.

The processor 15 can in some embodiments be configured to execute various program codes. The implemented program codes, in some embodiments can comprise such routines as audio signal/tactile signal processing or control code where electronic signals are processed and output to the display and/or other audio transducer output means, or actuator processing configured to generate an actuator signal for driving an actuator coupled to the display or an audio transducer separate from the display. The implemented program codes can in some embodiments be stored for example in the memory 16 and specifically within a program code section 17 of the memory 16 for retrieval by the processor 15 whenever needed. The memory 15 in some embodiments can further provide a section 18 for storing data, for example data that has been processed in accordance with the application, for example processed audio signal data.

The touch input module 11 can in some embodiments implement any suitable touch screen interface technology. For example in some embodiments the touch screen interface can comprise a capacitive sensor configured to be sensitive to the presence of a finger above or on the touch screen interface. The capacitive sensor can comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module can be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This physical change therefore causes a change in the electrical current which is registered as a touch event and sent to the processor for processing.

In some other embodiments the touch input module can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition. In some embodiments it would be understood that 'touch' can be defined by both physical contact and 'hover touch' where there is no physical contact with the sensor but the object located in close proximity with the sensor has an effect on the sensor.

The apparatus 10 can in some embodiments be capable of implementing the processing techniques at least partially in hardware, in other words the processing carried out by the processor 15 may be implemented at least partially in hardware without the need of software or firmware to operate the hardware.

The transceiver 13 in some embodiments enables communication with other apparatus or electronic devices, for example in some embodiments via a wireless communication network.

The display 12 may comprise any suitable display technology. For example the display element can be located below the touch input module and project an image through the touch input module to be viewed by the user. The display 12 can employ any suitable display technology such as liquid crystal display (LCD), light emitting diodes (LED), organic light emitting diodes (OLED), plasma display cells, Field emission display (FED), surface-conduction electron-emitter displays (SED), and Electrophoretic displays (also known as electronic paper, e-paper or electronic ink displays).

The concept of the embodiments described herein is with respect to processing and routing audio signals in a more flexible and efficient manner than currently implemented in tactile audio display apparatus. It has been proposed that by implemented in display which is flexible and suitable for being actuated that the display can be configured to generate localised tactile effects. Furthermore it has been proposed that such a display can further generate acoustic waves which can be heard by the user of such devices. Such displays are called tactile audio displays or tactile audio display apparatus. It has been proposed that in order to reduce bandwidth in transmission and storage and mechanical implementations that combined tactile effect and acoustic wave generation information can found within a combined audio and haptic feedback electronic signal, a mixed master signal. In other words both 'acoustic' audio and haptic feedback signals are mixed together into the mixed master signal which is output to the transducer to generate both the acoustic and the haptic effects. In some situations where the two signals are mixed together, there is static latency between them which eases the feedback signal design. The problem with such an implementation is that volume control applies to both acoustic and haptic feedback strength and they cannot be routed to separate outputs.

The concept implemented within the description utilizes signal processing methods to separate audio and haptic feedback signals from a "mixed master" signal to enable separate controls and processing for each of the separate acoustic (audio) and haptic (tactile) effects.

However it would be understood that in some embodiments the concept may be the generation of the mixed master signal.

For example a method comprising generating at least one signal comprising a haptic signal part and an audio signal part. Furthermore in some embodiments the method of generating the at least one signal may comprise combining the haptic signal part and the audio signal part. The combining in some embodiments may be frequency combining the haptic signal part as a lower frequency component of the at least one signal and the audio signal part as the higher frequency component of the at least one signal. However any suitable combining may be employed such as temporal combining the haptic signal part as a first time instance component of the at least one signal and the audio signal part as a separate second time instance component of the at least one signal or channel combining the haptic signal part as a first channel component of the at least one signal and the audio signal part as a second channel component of a multichannel signal.

Thus for example in some embodiments the concept may be further storing the at least one signal within a storage element such that at a later time the embodiments as described herein can further receive the at least one signal from the storage element. Or in some embodiments transmitting the at least one signal from a first apparatus such that the method can further receive the at least one signal at a further apparatus.

In other words the generation of the audio signal can be implemented in some embodiments by an apparatus comprising: means for generating at least one signal comprising a haptic signal part and an audio signal part, wherein generating the at least one signal comprises combining the haptic signal part and the audio signal part in at least one of: frequency combining (for example within a frequency division multiplexer) the haptic signal part as a lower frequency component of the at least one signal and the audio signal part as the higher frequency component of the at least one signal; temporal combining (for example by a time division multiplexer) the haptic signal part as a first time instance component of the at least one signal and the audio signal part as a separate second time instance component of the at least one signal; and channel combining (for example within a channel multiplexer) the haptic signal part as a first channel component of the at least one signal and the audio signal part as a second channel component of a multichannel signal. The apparatus may further thus comprise at least one of: means for storing the at least one signal within a storage element such that at a later time the apparatus can further receive the at least one signal from the means for storing; and means for transmitting the at least one signal such that at least one further apparatus may receive the at least one signal.

Figure 2:
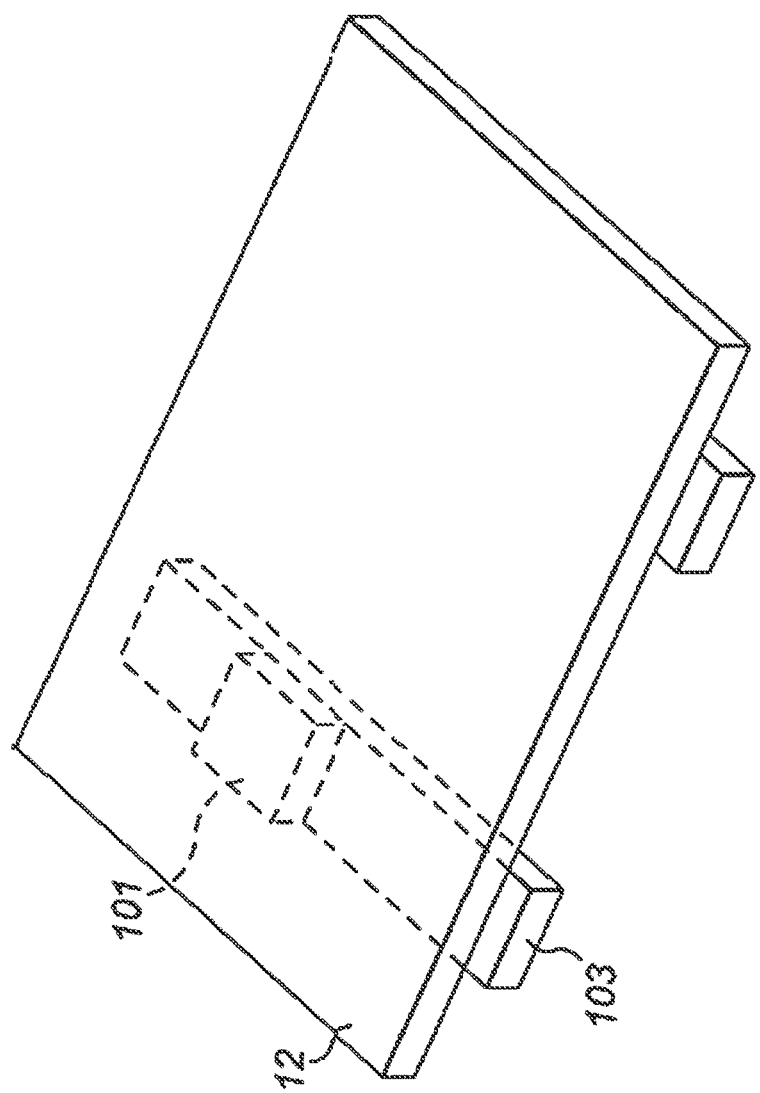
FIG. 2 shows schematically an example tactile audio display with transducer implementation.

An example tactile audio display implementation comprising the display and transducer (or actuator) is shown in FIG. 2. FIG. 2 specifically shows the touch input module 11 and display 12 under which is coupled a pad 101 which can be driven by the transducer 103 located underneath the pad. The motion of the transducer 103 can then be passed through the pad 101 to the display 12 which can then be felt by the user. The transducer or actuator 103 can in some embodiments be a piezo or piezo electric transducer configured to generate a force, such as a bending force when a current is passed through the transducer. This bending force is thus transferred via the pad 101 to the display 12. It would be understood that in other embodiments the arrangement, structure or configuration of the tactile audio display component can be any suitable coupling between the transducer (such as a piezo-electric transducer) and the display. In such a way it can be possible with suitable arrangement of transducers and pads and suitable configuration of the transducers and pads and knowledge of modes of resonance of the display to generate tactile effects across display area as well as operating as an air displacement piston generating acoustic waves of defined amplitude, frequency and direction.

Figure 3:
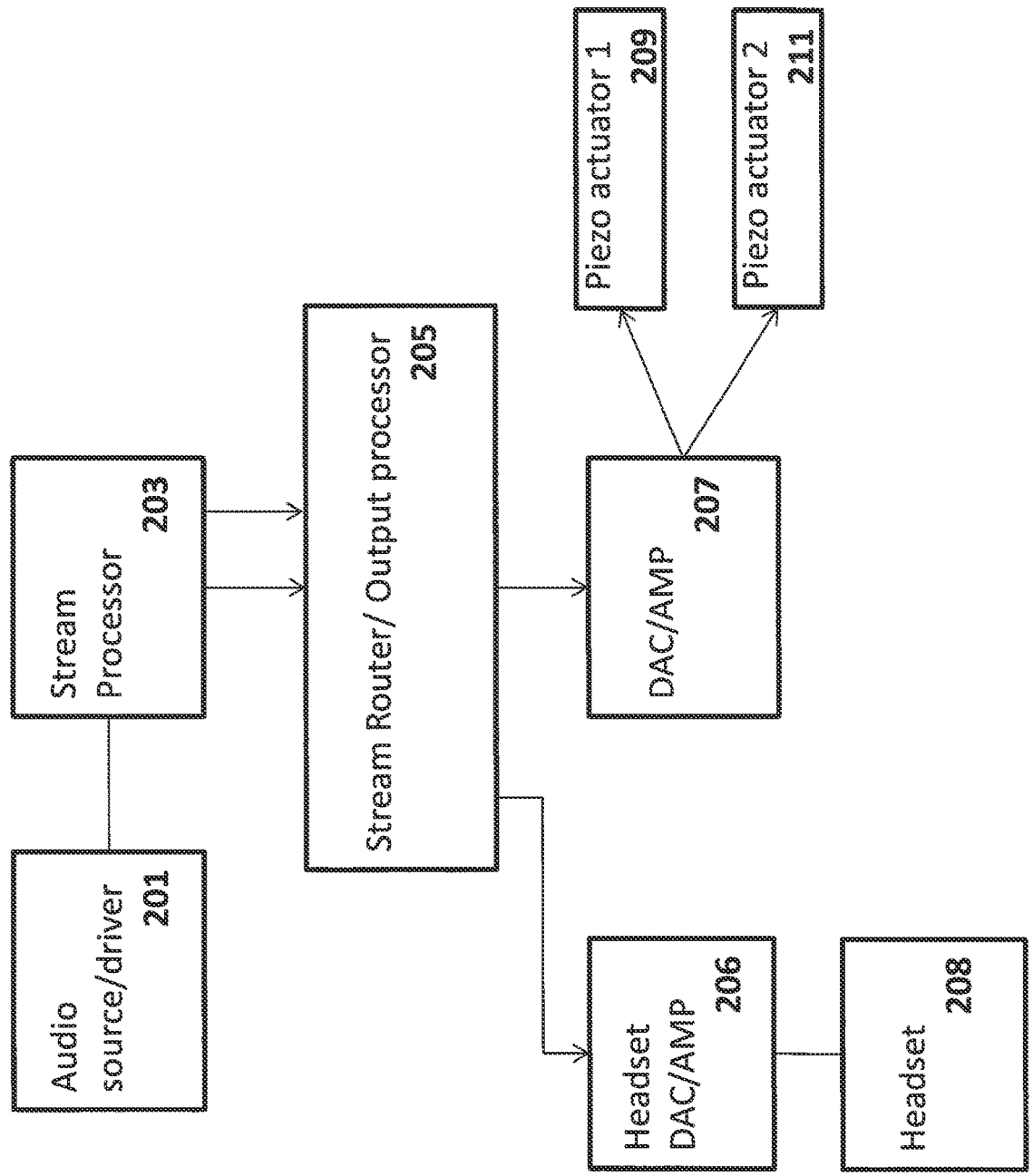

With respect to FIG. 3 a suitable audio/tactile effect generator system apparatus is described with respect to some embodiments. With respect to FIG. 3 a first audio/tactile effect generator system apparatus is described.

In some embodiments the apparatus comprises an audio source/audio driver 201 or input. The audio source/audio driver 201 can be configured in some embodiments to receive, generate or retrieve an audio signal or master signal (or signal) comprising an audio display (acoustic) part and tactile display (haptic) part. In some embodiments the audio display part is the higher frequency components of the master signal and the tactile display part the lower frequency components of the same master signal. In other words the master signal is mixed such that the acoustic wave generating parts are in the higher frequency range and the tactile or haptic parts are in the lower frequency range. In some embodiments the audio source/audio driver 201 generates the mixed signal. For example the audio source/audio driver mixes an audio signal to be output by the display (or other acoustic hardware) with a tactile effect to also be output by the display. In some embodiments the audio source/audio driver 201 retrieves the master signal from memory. In some embodiments the audio source/audio driver 201 receives the master signal from a transceiver or receiver.

The audio source/audio driver 201 in some embodiments is configured to output the master signal (audio signal) to a stream processor 203.

In some embodiments the apparatus comprises a stream processor 203 or suitable means for processing the master signal. The stream processor 203 is configured to receive the master signal (mixed audio signal) and generate and process separate signal streams from the master signal. In some embodiments the streams represent signal components for different types of outputs such as audio/acoustic output and tactile/haptic output, however in some embodiments the streams can represent signal components for different or separate transducers or types of transducers. For example a first stream for a first channel transducer, a second stream for a second channel transducer.

The stream processor 203 can in some embodiments separate the streams from a master signal by frequency domain processing, in other words the streams are frequency division multiplexed. For example as described herein high pass filtering the master signal to generate a suitable audio/acoustic stream signal and low pass filtering the master signal to generate a suitable tactile/haptic stream signal. However in some embodiments band pass filtering can be used to select specific bands from the master signal. In some embodiments the stream processor 203 can in some embodiments separate the streams from a master signal by time domain processing, in other words the streams are time division multiplexed. Thus for example the master signal first time period is selected to generate a suitable audio/acoustic stream signal and a second time period is selected to generate a suitable tactile/haptic stream signal. Furthermore in some embodiments the stream processor 203 can be configured to separate the streams from the master signal by channel processing. In other words the streams are multiplexed as different channels of a multichannel system (or channel multiplexed). For example the master signal can be a stereo signal of which the left channel is the audio/acoustic stream signal and the right channel is the tactile/haptic stream signal. In some embodiments where the master signal is a multichannel signal one or more channels can be audio/acoustic stream signals and one or more of the channels can be tactile/haptic stream signals.

The stream processor 203 can furthermore, having generated the streams, process each stream separately.

The streams or processed signal streams can be then output.

In some embodiments the stream processor 203 can be configured to output the streams or signal streams to a stream router/output processor 205.

Figure 6:
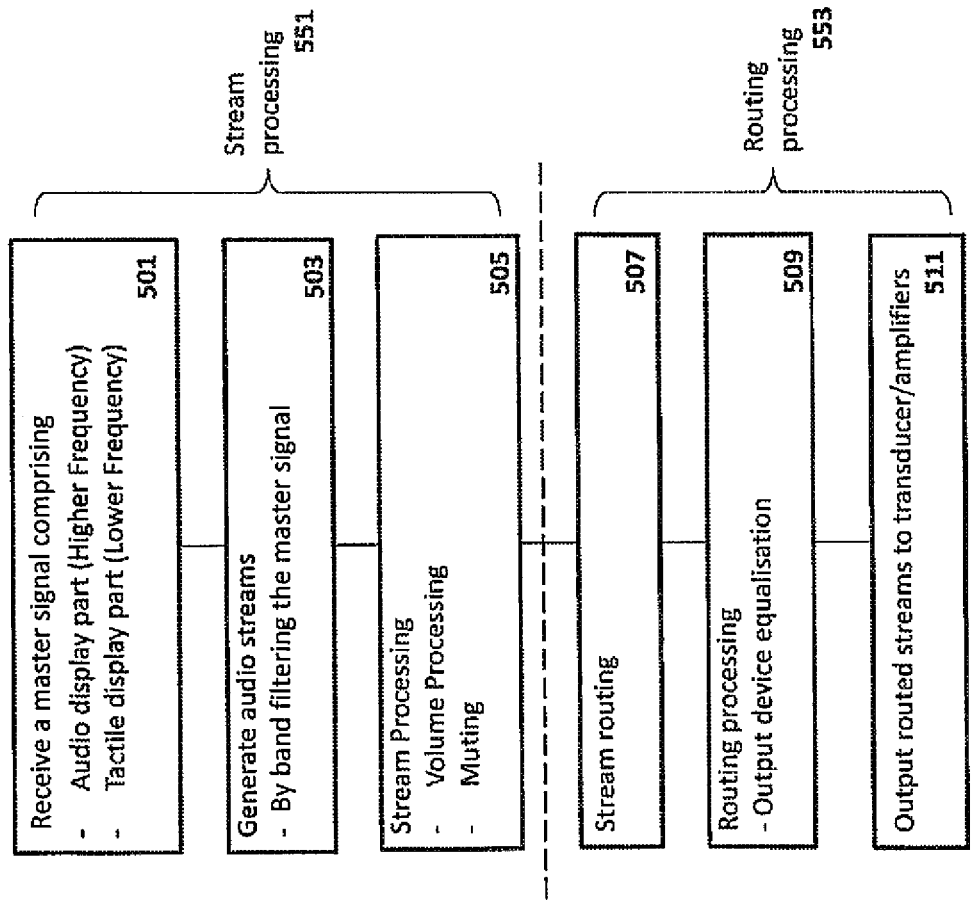
FIG. 6 shows a flow diagram of the operation of the audio/tactile effect control and generation apparatus according to some embodiments.

The operation of stream generating and processing is shown in FIG. 6 by step 551.

In some embodiments the apparatus comprises a stream router/output processor 205. The stream router/output processor 205 can be configured to receive the (processed or unprocessed) signal streams from the stream processor 203. The stream router/output processor 205 can then be configured to route the signal streams according to their destination enabling a more flexible routing of audio and/or tactile streams. Furthermore in some embodiments the stream router/output processor 205 can be configured to apply specific routing processing, in other words processing directed at the output transducer. The stream router/output processor 205 can thus output a processed and routed stream. In some embodiments the streams can be routed to, for example, a digital-to-analogue converter, an amplifier, or directly to an actuator.

The operation of performing routing processing is shown in FIG. 6 by step 553.

In some embodiments the apparatus comprises a digital-to-analogue converter (DAC)/amplifier (amp) 207. The DAC/amp is configured in some embodiments to receive the stream signals which have been routed to the piezoelectric actuators, in other words piezoelectric stream(s) from the stream router/output processor 205. The DAC/amp 207 can then be configured to perform a digital-to-analogue conversion and/or amplification on the signal streams prior to outputting the stream signals to the piezoelectric actuators. In the example shown herein there is a single DAC/amp for all of the actuators, however it would be understood that in some embodiments there can be more than one DAC and/or amplifier for the actuators and in some embodiments each actuator is supplied an actuation signal from an associated DAC and/or amplifier.

In some embodiments the apparatus comprises piezoelectric actuators. In the example shown in FIG. 3 there are two piezoelectric actuators, piezo actuator 1 209 and piezo actuator 2 211. In some embodiments each actuator is configured to receive an output from the DAC/amp 207. In some embodiments the signal sent to both of the actuators can be the same. However it would be understood that in some embodiments the piezoelectric stream is a multichannel stream or a multichannel stream is generated and each channel from the stream is routed to difference piezoelectric actuators such that haptic and/or audio signals can be localised on the display by the resonance modes and constructive and destructive interference waves generated by actuating the display. In some embodiments each output actuator or channel can be assigned or designated a stream for the piezo actuators or in some embodiments a single stream can be de-multiplexed into individual channels.

In some embodiments the apparatus comprises a separate headset digital-to-analogue converter (DAC)/amplifier (amp) 206. The headset digital-to-analogue converter/amplifier 206 can in some embodiments receive a 'headset routed' stream from the stream router/output processor 205 which can in some embodiments differ from the stream received at the DAC/amp 207 (in other words receive a pure audio or headset audio stream). The headset DAC/amp 206 can be configured to perform a digital-to-analogue conversion and amplification of the headset signal stream and output the processed signal stream to the headset 208.

In some embodiments the apparatus comprises a headset 208 coupled to the apparatus and configured to receive the output of the headset DAC/amp 206 and generate a suitable acoustic output to be heard by the user of the apparatus.

It would be understood that in some embodiments in a manner similar to that described herein the stream may comprise more than one channel of audio data or in some embodiments more than one stream can be received by the headset DAC/amplifier 206 and headset 208 in such a way that multichannel audio signals can be produced with each channel having a separate stream.

With respect to FIGS. 4, 5 and 6 schematically more detailed examples of the apparatus are shown. In the example shown herein the stream processing is performed according to frequency domain processing however as described herein the processing or stream separation can be generated using any suitable signal separation approach. Furthermore in the following examples the apparatus is shown with respect to a single application. It would be understood that in some embodiments there may be other audio applications and other applications for providing haptic feedback being implemented substantially at the same time where the audio signals played by different applications to the same output may be mixed and the haptic signals played by different applications may also be mixed as well.

In the examples described herein the headset is a wired or galvanic headphone set, it would be understood that in some embodiments the headset can be any suitable headphone, earpiece, earphones, earbuds or earspeakers. Furthermore although in the examples the headset is connected or coupled directly by a cable or wire and therefore the apparatus comprises a DAC/amplifier for driving the headset it would be understood that in some embodiments the headset can receive a digital signal routed by the stream router and the headset comprises suitable means for presenting the routed signal to the transducers. Furthermore in some embodiments the headset is connected or coupled to the apparatus wirelessly and as such the stream router/output processor 205 can be configured to output the audio signal for the headset to a transmitter or transceiver for outputting the audio signal wirelessly. In other words in some embodiments the Rx port 2 319 is configured to output the signal to a transmitter, which in turn is wirelessly coupled to a receiver on the headset.

With respect to FIG. 4 an example is shown where the master signal comprises a first stream is tactile/haptic signal part which in the example shown herein in FIG. 4 is to be output or routed to the piezoelectric actuators for generating the haptic or tactile feedback on a display. The master signal further comprises a second stream, an audio/acoustic signal part which in the example shown herein in FIG. 4 is to be output or routed to a headset (or headphones) actuator for generating an acoustic wave heard by the user of the headphones. Although in the Example shown herein there are two streams it would be appreciated that in further embodiments there can be more than two streams.

In some embodiments the audio driver 201 can be informed when the master signal comprises audio or audio signals and tactile feedback signals. In some embodiments the audio driver 201 can be configured to implement this by receiving a tag or indicator associated with the main or master signal.

In the example shown herein the audio driver 201 outputs a master signal, which is encoded, comprising the at least two streams to the stream processor 203.

The stream processor 203 can be configured to receive the encoded master signal from the audio driver 201.

The operation of receiving the audio signal at the screen processor is shown in FIG. 6 by step 501.

In some embodiments the stream processor 203 comprises an audio decoder for each stream. Thus in the example shown in FIG. 4 the stream processor 203 comprises a first audio decoder, audio decoder 1, 301 associated with the first (tactile/haptic) stream, and a second decoder, audio decoder 2, 311 associated with the second (audio/acoustic) stream.

It would be understood that in some embodiments the stream processor 203 comprises a single decoder configured to decode the output of the audio driver and pass the decoded audio signal or decoded master signal to each of the stream processing parts. Furthermore in some embodiments the stream processor 203 is configured to receive a decoded or un-encoded master signal and therefore no decoder or decoding is required.

In some embodiments the stream processor 203 further comprises an audio stream post-processor for each stream. The stream post-processor can in some embodiments be considered to be a separator or stream separator (or means for separating) configured to separate the master signal into at least two signal types (for example audio and haptic signals). Thus as shown in FIG. 4 the tactile/haptic stream is generated/processed from the master signal by a first audio stream post processor, audio stream post-processor 1, 303 and the audio/acoustic stream is generated/processed from the master signal by the second audio stream post processor, audio stream post-processor 2, 313. The audio stream post-processors 303 and 313 can in some embodiments comprise filters configured to filter the master signal to generate the tactile/haptic and audio/acoustic streams from the master signal respectively. Thus for example audio stream post-processor 1, 303 comprises a low-pass filter to extract the lower frequency components of the master signal and audio stream post-processor 2, 313 comprises a high pass filter to extract the higher frequency components of the master signal.

Figure 7:
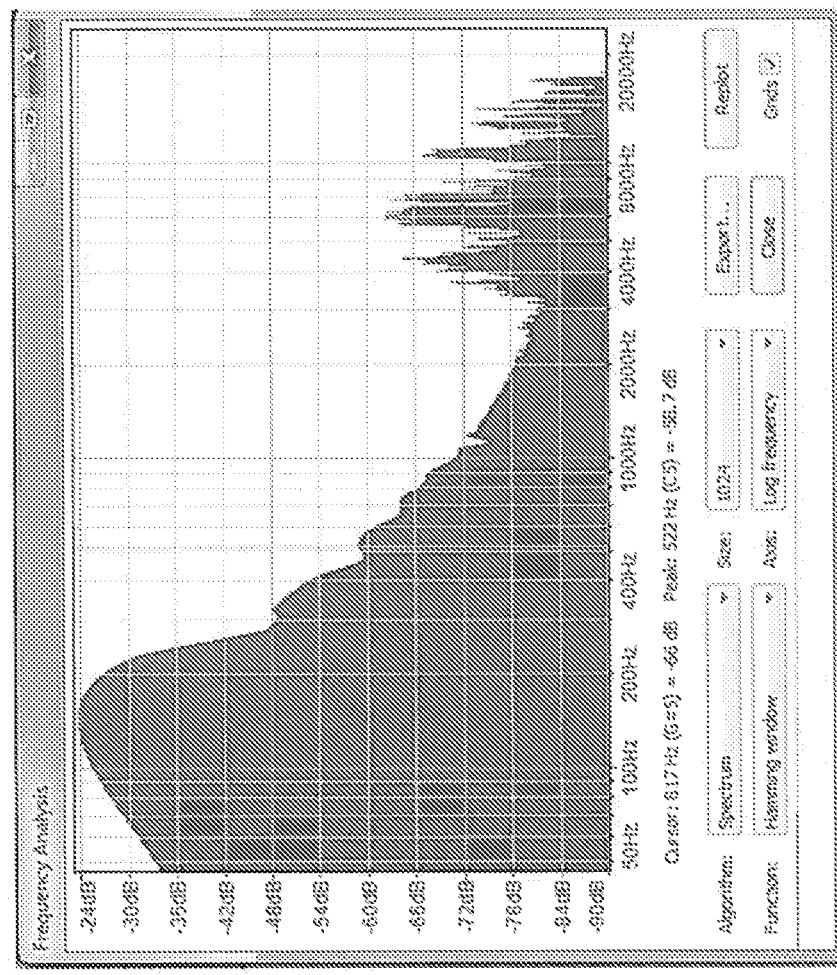
FIGS. 7 to 9 show schematically an example spectral frequency input and processed stream outputs from the audio/tactile effect control and generation apparatus as shown in FIGS. 3 to 5 according to some embodiments.
Figure 8:
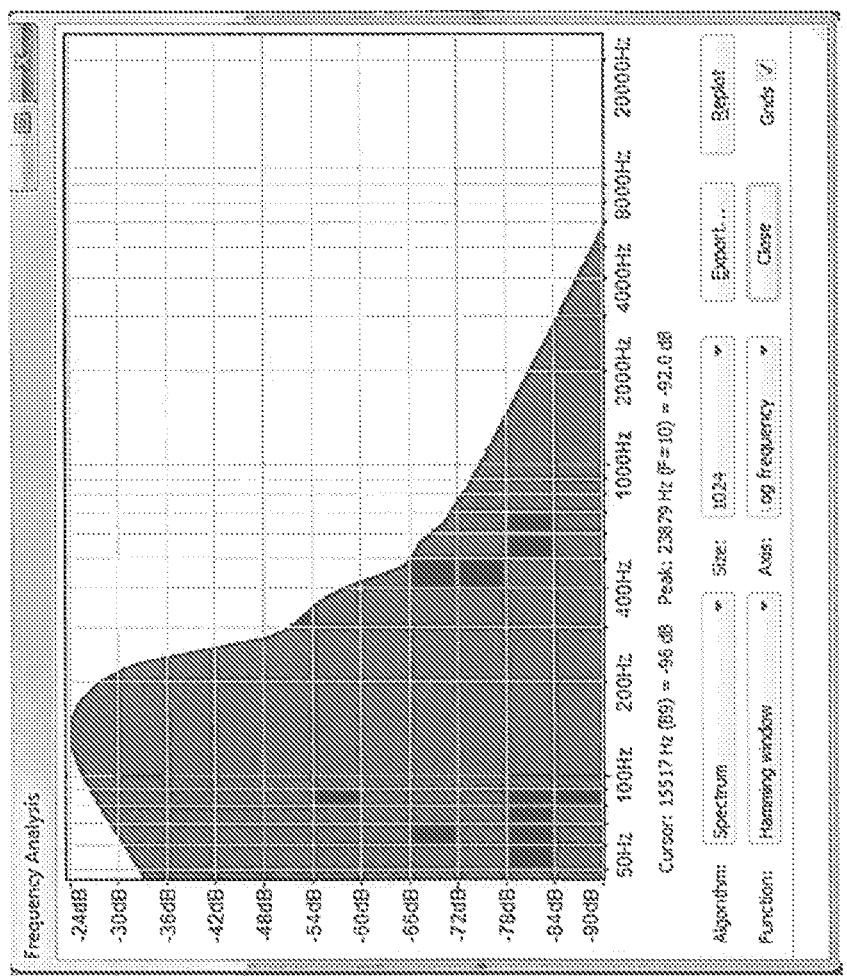
Figure 9:
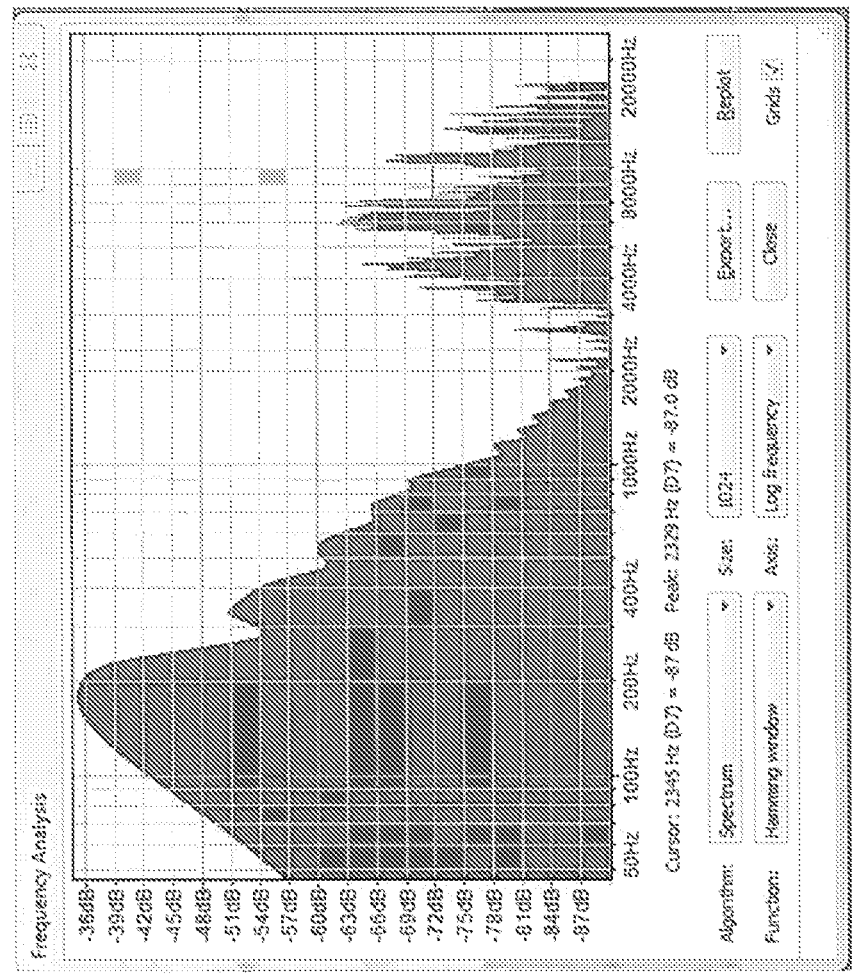

With respect to FIGS. 7 to 9 example spectral plots are shown representing an example master signal and filtered (or stream) output frequency spectrums. Thus for example FIG. 7 shows an example master signal, FIG. 8 shows the low pass filtered or tactile/haptic stream frequency spectrum and FIG. 9 shows the high pass filtered or audio/acoustic stream frequency spectrum.

Figure 10:
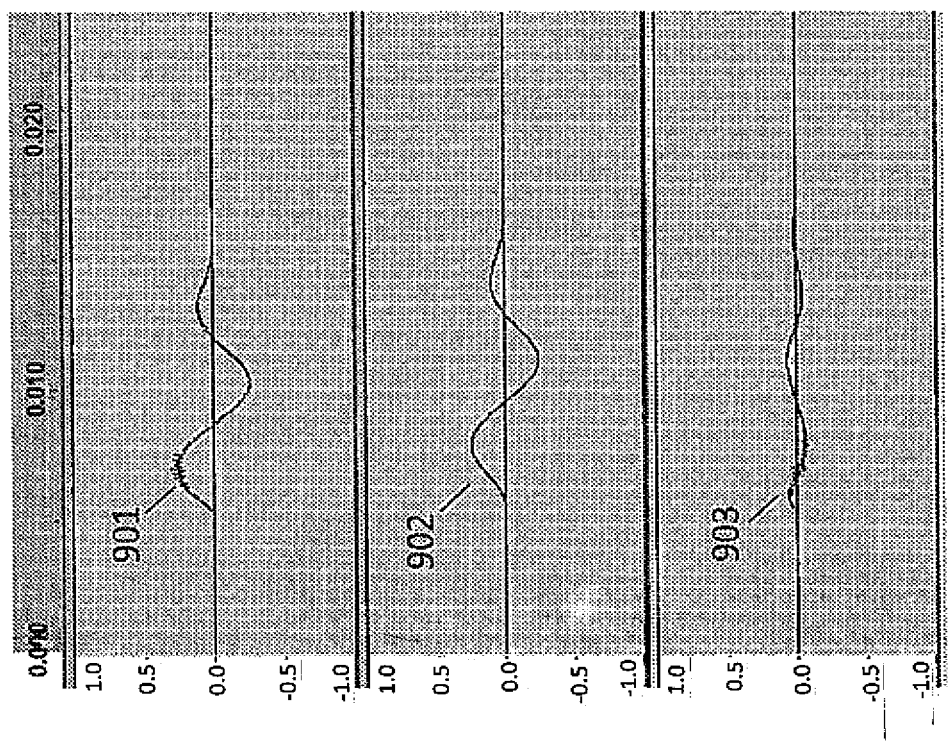
FIG. 10 shows schematically a time domain representation of an example input and processed stream outputs from the from the audio/tactile effect control and generation apparatus as shown in FIGS. 3 to 5 according to some embodiments.

Furthermore with respect to FIG. 10 a time domain plot of an example signal, tactile/haptic stream and audio/acoustic stream is shown. The upper plot of FIG. 10 shows the master signal plot 901, the middle plot shows the low pass frequency or tactile/haptic stream plot 903 produced by low-pass filtering the master signal, and the bottom plot shows the audio/acoustic stream plot 905 produced by high-pass filtering the master signal.

The operation of generating audio streams by band filtering the audio signal is shown in FIG. 6 by step 503.

In some embodiments the stream processor and in particular the audio stream post-processors (such as audio stream post processor 1 303 and audio stream post processor 2 313) can be configured to perform additional post-processing of the signal such as stream specific gain control or stream volume control or muting of the streams. It would be understood that in some embodiments any suitable stream based processing can be performed other than gain/volume control.

The streams, having been processed, are then output by the audio stream post-processor 303 313 to the stream router/output processor 205.

The operation of stream processing such as volume/gain processing and muting is shown in FIG. 6 by step 505.

In some embodiments as described herein the stream router/output processor 205 can be configured to receive the stream signals, route the streams according to a defined destination dependent on any stream tag or information, optionally perform output based processing, and output the routed streams to the audio hardware/actuators for generating the relevant output.

In some embodiments the stream router/output processor 205 comprises an audio receiver (rx) matrix 305. The audio receiver matrix 305 is configured in some embodiments to receive the streams or stream signals from the stream processor 203 and route the streams to a suitable output or output pathway. The audio rx matrix can in some embodiments therefore be seen as a stream to output transformer. The audio receiver matrix 305 as shown in FIG. 4 is configured to route or direct the input tactile/haptic stream to the piezoelectric actuator or display output and the audio/acoustic stream to the headset actuator or headset output.

The signal routed to the piezoelectric actuator (the tactile/haptic stream) is then in some embodiments passed to a first common audio post processor 307 and the signal routed to the headset output (the audio/acoustic stream) to a second common audio post processor 317.

The operation of stream routing or stream to output transfer is shown in FIG. 6 by step 507.

In some embodiments the stream router/output processor 205 comprises a 'common' audio post processor bank. The common audio post processor bank comprises a series of post processors, one per output, shown in FIG. 4 as a first common audio post processor 307 and a second common post audio pros processor 317. The common audio post-processor 307 317 can in some embodiments be configured to perform a processing which is based on the routing output. For example in some embodiments the common audio post-processor is configured to perform output device equalisation or tuning in order that the stream output produces a better quality output.

The common audio post processor bank can in some embodiments be configured to output the output streams to various receiver ports (Rx port).

The operation of routing processing is shown in FIG. 6 by step 509.

The stream router/output processor 205 can in some embodiments comprise receiver (Rx) ports or output ports configured to receive the output streams and pass the output streams to hardware for generating or actuating dependent on the stream signal.

Thus as shown in FIG. 4 the stream router/output processor comprises a first receiver port (Rx port 1) 309 configured to receive the piezoelectric output (the tactile/haptic stream signal) and pass the tactile/haptic stream to suitable piezoelectric actuator hardware. Furthermore the stream router/output processor 205 comprises a second receiver port (Rx port 2) 319 configured to receive the headset output (the audio/acoustic stream) and output this stream to the headset hardware.

The operation of outputting the routed streams to suitable hardware in the form of transducer and/or amplifiers and/or digital-to-analogue converters is shown in FIG. 6 by step 511.

Furthermore the apparatus comprises a DAC/amp 207 comprising a first DAC 321 and a first amplifier 323 configured to receive, convert to analogue and amplify before outputting the tactile/haptic stream signal to the piezoelectric actuator such as piezoelectric actuator 1, 209. Similarly the apparatus may comprise a DAC/amp 206 comprising a second DAC 331 and second amplifier 333 configured to receive the audio/acoustic stream, convert the signal to analogue form, amplify before outputting to a headset actuator to generate an acoustic output.

With respect to FIG. 5 a further example apparatus is shown. The apparatus shown in FIG. 5 is similar to that shown in FIG. 4 is shown however in the example shown in FIG. 5 both the audio/acoustic stream and the tactile/haptic stream are routed by the audio receiver matrix 315 in a further configuration to the piezoelectric actuator output. In other words FIG. 5 shows a use case where both the audio and tactile feedback signals are routed to the piezoelectric actuator, which would for example be performed when using apparatus without a headset attached or coupled. In this example it is shown that despite the streams being routed to the same output that embodiments still implement separate stream generation. In such a manner the master signal is split in such a way that enables stream specific processing, such as gain/volume/muting control or other processing to each stream separately before remixing the streams.

It would be understood that in these embodiments by using high-pass and low-pass filtering to separate the main or master signals the flexibility of stream processing without requiring separate stream signal synchronization and accurate timing of the separate signals which would be required in situations where separate streams carried in separate logical or physical signals.

Furthermore the approach described herein can be easily implemented within devices which do not control the operating system user interface functionality. In other words by using a single signal (master signal) a device can handle the separate streams even where the device lacks some hardware designated by the master signal. Furthermore in some embodiments the master signal will typically have a smaller file or data size than would be possible in separate signals implementing the same functionality.

It would be understood that there can be more than or fewer than two piezo actuators and furthermore in some embodiments the actuator can be an actuator other than a piezo actuator.

It shall be appreciated that the term user equipment is intended to cover any suitable type of user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as nonlimiting examples.

Embodiments of the inventions may be designed by various components such as integrated circuit modules.

As used in this application, the term 'circuitry' refers to all of the following:
(a) hardware-only circuit implementations (such as implementations in only analogy and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
receiving at least one signal comprising a haptic signal part and an audio signal part;
separating the at least one signal to generate at least one haptic signal and at least one audio signal;
processing separately the at least one haptic signal to generate at least one processed haptic signal and the at least one audio signal to generate at least one processed audio signal, wherein the separate processing of the at least one haptic signal and the at least one audio signal comprises applying a gain control or a volume control or muting to the at least one haptic signal and applying a gain control or a volume control or muting to the at least one audio signal;
routing the at least one processed haptic signal as a first signal and the at least one processed audio signal as a second signal, wherein the first signal and the second signal are selectively routed to defined destinations according to signal generation information based on a routing being configured according to outputting for the first signal and the second signal;
applying routing specific processing separately to the first signal and to the second signal, wherein applying routing specific processing separately comprises equalizing and/or tuning the first signal and equalizing and/or tuning the second signal, the equalizing and/or tuning of the first signal and the second signal being based on hardware providing a respective haptic effect and a respective acoustic effect;

directing the processed first signal and the second signal to a first output and a second output, respectively; and outputting the processed first and second signals such that the processed first signal generates a haptic effect based on the first output and the processed second signal generates an acoustic effect based on the second output;

wherein the first signal generates at least one processed haptic signal and the second signal generates at least one processed audio signal, wherein the processed haptic signal and the processed audio signal are separate streams and are processed separately; and wherein the at least one processed haptic signal and the at least one processed audio signal are selectively controllable independent from each other.

2. The method as claimed in claim 1, wherein separating the at least one signal comprises filtering the at least one signal to generate at least one of the at least one haptic signal and the at least one audio signal.

3. The method as claimed in claim 2, wherein filtering the at least one signals comprises:

low pass filtering the at least one signal to generate the at least one haptic signal; and high pass filtering the at least one signal to generate the at least one audio signal.

4. The method as claimed in claim 1, wherein routing the at least one haptic signal as the first signal and the at least one audio signal as the second signal comprises routing the at least one processed haptic signal and the at least one processed audio signal wherein the first output and the second output are separate outputs.

5. The method as claimed in claim 4, wherein routing the at least one haptic signal as the first output signal and the at least one audio signal as the second output signal comprises combining the at least one processed haptic signal and the at least one processed audio signal, wherein the first output and the second output are the same output.

6. The method as claimed in claim 1, wherein processing the first output signal and the second output signal comprises at least one of:

processing the first signal and the second signal based on the routing specific processing;

gain controlling the first signal and the second output signal based on the routing specific processing;

volume controlling the first signal and the second signal based on the routing specific processing; and muting the first signal and the second signal based on the routing specific processing.

7. The method as claimed in claim 1, wherein the first output is coupled to at least one of:

a tactile audio display;

at least one actuator configured to actuate an apparatus for generating the haptic effect;

at least one piezo-electric actuator configured to actuate an apparatus for generating the haptic effect;

at least one vibra; and at least one digital to analogue converter and/or amplifier configured to pass a signal to an actuator for actuating the apparatus.

8. The method as claimed in claim 1, wherein the second output is coupled to at least one of:

a tactile audio display;

at least one piezo-electric actuator configured to actuate an apparatus for generating the acoustic effect;

a headset;

headphones;

earphones;

earspeakers;

earbuds; and at least one digital to analogue converter and/or amplifier configured to pass a signal to an actuator for generating an acoustic output.

9. The method as claimed in claim 1, wherein separating the at least one signal to generate at least one haptic signal and at least one audio signal comprises:

identifying within the at least one signal a first track comprising the at least one haptic signal and a second track comprising the at least one audio signal.

10. The method as claimed in claim 9, wherein the at least one signal comprises a multichannel audio signal and identifying within the at least one signal the first track comprising the at least one haptic signal and the second track comprising the at least one audio signal comprises:

determining a first channel is the at least one haptic signal; and determining a second channel is the at least one audio signal.

11. The method as claimed in claim 1, further comprising filtering using band pass filtering to select one or more specific bands from the at least one signal.

12. The method as claimed in claim 1, wherein processing the first output signal from the processor and processing the second output signal from the processor comprises band pass filtering to attenuate one or more of the haptic signal part and the audio signal part.

13. A method comprising:

generating at least one signal comprising a haptic signal part and an audio signal part so as to adjust the haptic signal part separately from the audio signal part, applying a gain control or a volume control or muting to the haptic signal part and applying a gain control or a volume control or muting to the audio signal part, wherein generating the at least one signal comprises routing the haptic signal part and the audio signal part through a processor, wherein the haptic signal part and the audio signal part are selectively routed to defined destinations according to signal generation information based on a routing being configured according to outputting for the haptic signal part and the audio signal part, processing the haptic signal part from the processor and processing the audio signal part from the processor comprising equalizing and/or tuning the processed haptic signal part and the processed audio signal part, directing the processed haptic signal part and audio signal part to processor outputs, and combining the haptic signal part and the audio signal part in at least one of:

frequency combining the haptic signal part as a lower frequency component of the at least one signal and the audio signal part as the higher frequency component of the at least one signal;

temporal combining the haptic signal part as a first time instance component of the at least one signal and the audio signal part as a separate second time instance component of the at least one signal; and channel combining the haptic signal part as a first channel component of the at least one signal and the audio signal part as a second channel component of a multi-channel signal;

wherein the haptic signal part is separate from the audio signal part and is processed separate from the audio signal part; and wherein the haptic signal part and the audio signal part are selectively controllable, independent from each other, in a storage element such that at a later time the method further receives at least one of the haptic signal part and the audio signal part from the storage element.

14. The method as claimed in claim 13, further comprising transmitting the at least one signal from a first apparatus such that the method further receives the at least one signal at a further apparatus.

15. The method as claimed in claim 13, further comprising a first stream for the haptic signal part and a second stream for the audio signal part.

16. The method as claimed in claim 13, wherein generating further comprises using a stream separator configured to separate the at least one signal into the audio signal part and the haptic signal part.

17. An apparatus comprising at least one processor and at least one memory including computer program code for one or more programs, the at least one memory and the computer program code configured to, with the at least one processor, cause the apparatus at least to:
receive at least one signal comprising a haptic signal part and an audio signal part;
separate the at least one signal to generate at least one haptic signal and at least one audio signal;
process separately the at least one haptic signal to generate at least one processed haptic signal and the at least one audio signal to generate at least one processed audio signal, wherein the separate processing of the at least one haptic signal and the at least one audio signal comprises applying a gain control or a volume control or muting to the at least one haptic signal and applying a gain control or a volume control or muting to the at least one audio signal;
route the at least one processed haptic signal as a first signal and the at least one processed audio signal as a second signal, wherein the first signal and the second signal are selectively routed to defined destinations according to signal generation information based on a routing being configured according to outputting for the first signal and the second signal;
process, by applying routing specific processing, the first signal and process, by applying routing specific processing, the second signal, wherein applying routing specific processing comprises equalizing and/or tuning the first signal and equalizing and/or tuning the second signal, the equalizing and/or tuning of the first signal and the equalizing and/or tuning of the second signal being based on hardware providing a respective haptic effect and a respective acoustic effect;
direct the processed first signal and the second signal to a first output and a second output, respectively; and
output the processed first and second signals such that the processed first signal generates a haptic effect based on the first output and the processed second signal generates an acoustic effect based on the second output;
wherein the first signal comprises at least one processed haptic signal and the second signal comprises at least one processed audio signal, wherein the processed haptic signal and the processed audio signal are separate streams and are processed separately; and
wherein the at least one processed haptic signal and the at least one processed audio signal are selectively controllable independent from each other.

18. An apparatus comprising at least one processor and at least one memory including computer program code for one or more programs, the at least one memory and the computer program code configured to, with the at least one processor, cause the apparatus at least to:
generate at least one signal comprising a haptic signal part and an audio signal part so as to adjust the haptic signal part separately from the audio signal part,
apply a gain control or a volume control or muting to the haptic signal part and apply a gain control or a volume control or muting to the audio signal part,
wherein generating the at least one signal comprises routing the haptic signal part and the audio signal part through a processor, wherein the haptic signal part and the audio signal part are selectively routed to defined destinations according to signal generation information based on a routing being configured according to outputting for the haptic signal part and the audio signal part, processing the haptic signal part from the processor and processing the audio signal part from the processor comprising equalizing and/or tuning the processed haptic signal part and the processed audio signal part, directing the processed haptic signal part and audio signal part to processor outputs, and combining the haptic signal part and the audio signal part in at least one of:
frequency combining the haptic signal part as a lower frequency component of the at least one signal and the audio signal part as the higher frequency component of the at least one signal;
temporal combining the haptic signal part as a first time instance component of the at least one signal and the audio signal part as a separate second time instance component of the at least one signal; and
channel combining the haptic signal part as a first channel component of the at least one signal and the audio signal part as a second channel component of a multi-channel signal;
wherein the haptic signal part is separate from the audio signal part and is processed separate from the audio signal part; and
wherein the haptic signal part and the audio signal are selectively controllable independent from each other.

* * * * *

UNITED STATES PATENT AND TRADEMARK OFFICE
CERTIFICATE OF CORRECTION

| | | |
|---|---|---|
| PATENT NO. | : 10,521,015 B2 | Page 1 of 1 |
| APPLICATION NO. | : 14/769447 | |
| DATED | : December 31, 2019 | |
| INVENTOR(S) | : Yliaho | |

It is certified that error appears in the above-identified patent and that said Letters Patent is hereby corrected as shown below:

In the Claims

Claim 6, Column 19, Line 45 "output" should be deleted after --second--.

Signed and Sealed this
Eleventh Day of February, 2020

Andrei Iancu
*Director of the United States Patent and Trademark Office*